US006864952B2

(12) United States Patent
Schindler et al.

(10) Patent No.: US 6,864,952 B2
(45) Date of Patent: Mar. 8, 2005

(54) METHOD OF AUTOMATICALLY EVALUATING IMAGES BEING PROCESSED IN A PHOTOGRAPHIC LABORATORY SYSTEM

(75) Inventors: Hans-Georg Schindler, Holzkirchen (DE); Thomas Hagen, Neufarn (DE); Stephan Thormann, Worthsee (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/664,627

(22) Filed: Sep. 18, 2003

(65) Prior Publication Data

US 2004/0057029 A1 Mar. 25, 2004

(30) Foreign Application Priority Data

Sep. 24, 2002 (EP) ........................................... 02021178

(51) Int. Cl.[7] .......................... G03B 27/52; G03B 27/32
(52) U.S. Cl. ........................................... 355/40; 355/77
(58) Field of Search .............................. 355/38, 40–41, 355/77; 396/611

(56) References Cited

U.S. PATENT DOCUMENTS 3,706,373 A 12/1972 Smith
5,210,570 A * 5/1993 Minamisawa et al. ........ 355/38
5,798,820 A 8/1998 Kraft et al.
6,157,435 A * 12/2000 Slater et al. .................. 355/40
6,249,315 B1 * 6/2001 Holm ......................... 348/251

FOREIGN PATENT DOCUMENTS

WO WO 01/14928 A2 3/2001

* cited by examiner

*Primary Examiner*—Henry Hung Nguyen
(74) *Attorney, Agent, or Firm*—Darby & Darby

(57) ABSTRACT

Images being processed in a photographic laboratory system into different forms of output are automatically evaluated to determine for each image whether it is of sufficient quality to merit processing into a selected form of output. Each image is individually evaluated by determining a grade value for each of one or more characteristic properties of the image, by assigning a target value to each of the characteristic image properties relative to each available form of output, and by comparing the grade value to the target value for a selected form of output.

14 Claims, 4 Drawing Sheets

50

| Image No. 1 | |
|---|---|
| Image Data | |
| Characteristic Properties | Grade Value |
| Underexposed | 0 |
| Overexposed | 0 |
| Contrast | 0 |
| Sharpness | 0 |
| Resolution | 0 |
| Grain Size | 0 |
| % Cut-Off | 0 |
| Fill-in Frame | Yes |

52 54 56

• • •

| Image No. n | |
|---|---|
| Image Data | |
| Characteristic Properties | Grade Value |
| Underexposed | 100 |
| Overexposed | 85 |
| Contrast | 90 |
| Sharpness | 100 |
| Resolution | 80 |
| Grain Size | 80 |
| % Cut-Off | 100 |
| Fill-in Frame | No |

58

Fig. 2

| Form of Output<br>Index Print | |
|---|---|
| Characteristic Properties | Grade Value |
| Underexposed | 0 |
| Overexposed | 0 |
| Contrast | 0 |
| Sharpness | 0 |
| Resolution | 0 |
| Grain Size | 0 |
| % Cut-Off | 0 |
| Fill-in Frame | No |

60 56 62

Fig. 3

| Form of Output<br>3 ½" Print | |
|---|---|
| Characteristic Properties | Grade Value |
| Underexposed | 80 |
| Overexposed | 80 |
| Contrast | 80 |
| Sharpness | 80 |
| Resolution | 80 |
| Grain Size | 90 |
| % Cut-Off | 100 |
| Fill-in Frame | No |

60 56 62

Fig. 4

| Form of Output<br>CD_ROM | |
|---|---|
| **Characteristic Properties** | **Grade Value** |
| Underexposed | 0 |
| Overexposed | 0 |
| Contrast | 0 |
| Sharpness | 0 |
| Resolution | 0 |
| Grain Size | 0 |
| % Cut-Off | 0 |
| Fill-in Frame | Yes |

60, 56, 62

Fig. 5

| Form of Output<br>Internet | |
|---|---|
| **Characteristic Properties** | **Grade Value** |
| Underexposed | 0 |
| Overexposed | 0 |
| Contrast | 0 |
| Sharpness | 0 |
| Resolution | 0 |
| Grain Size | 0 |
| % Cut-Off | 0 |
| Fill-in Frame | No |

60, 56, 62

Fig. 6

METHOD OF AUTOMATICALLY EVALUATING IMAGES BEING PROCESSED IN A PHOTOGRAPHIC LABORATORY SYSTEM

BACKGROUND OF THE INVENTION

The invention relates to a method of automatically evaluating the quality of images and image data to determine whether they merit being processed into an output product in a photographic laboratory system.

Conventional state-of-the-art photo laboratory systems offer a wide diversity of output formats to deliver image copies or image data in accordance with individual customer requests for each order. For example, pictures in the same customer order can be produced in different print formats on photographic paper, and the individual prints can in addition be differentiated between matte finish and glossy finish. In addition, so-called index prints are delivered with each customer order, which show all of the exposures on a film-developing order that meet minimum output quality standards in a numbered sequence, in some cases also including those exposures that were actually graded as failing minimum output quality standards, with information why the image was classified as a reject.

As an alternative or in addition, the images can be offered to the customer in the form of digital image data on electronic data carriers such as CD-ROMs, DVDs and the like. Furthermore, the image data of a customer order can also be transmitted through the Internet by way of data interfaces directly to the end customer, or they can be posted in a website album.

Conventional state-of-the-art methods of assessing whether images and image data are of sufficient quality to be included in the order output use a fixed accept/reject scheme based on a simple yes/no determination of whether an image meets certain quality criteria such as correct exposure light level, adequate sharpness, adequate contrast and the like, without differentiating between the different possible output forms. For cost reasons, only those images or image data that met the output quality criteria are produced at the output. Those exposures that did not make the grade for acceptable output are shown only on the index print for the customer's information.

OBJECT AND SUMMARY OF THE INVENTION

The present invention has the objective to propose a method of automatically evaluating images or image data against output quality criteria in which the decision on whether or not an image or a set of image data is fit for output depends directly on the specific form of output that was selected for that image or set of image data.

To meet the foregoing objective, the invention proposes a method of automatically evaluating images or image data against output quality criteria in a photographic laboratory system that produces a plurality of different forms of output. The inventive method has the steps of determining grade values for at least one characteristic image property, assigning target values that the at least one image property must meet for different forms of output, and comparing the grade values with the specific target values assigned to the selected form of output.

As an essential concept of the inventive method, the different image characteristics are subjected to a differentiated evaluation rather than a mere yes/no decision. The method provides individual target criteria which may be different for each of the available output options such as different photographic paper formats, index prints, or electronic output media. Based on the differentiated evaluation of the image characteristics in relation to the target values, the automatic determination of the fitness for output is made separately for each available form of output. This allows a targeted selection among the different possibilities for producing an image which depend among other things on physical factors such as grain size, so that the result is optimized in each case specifically for the selected form of output. For example, if the image is to be delivered in the form of a 3 ½" paper copy, a relatively coarse grain size will already be sufficient for the image to be passed as fit for output, because an adequate image quality is attained in such small print formats even with a coarse grain size. If on the other hand the image is to be reproduced, e.g., in a large-format paper copy, then the image original needs to have a considerably finer grain size in order to achieve an adequate image quality in the large-size print.

The inventive method further offers the possibility to consider individual customer requests when accepting an order, as the target values for specific image characteristics can be set according to the customer's request or can be specified by the customer.

In a particularly preferred version of the inventive method, the grade values for the quality data of an image are determined by assigning a grade value to each image characteristic in accordance with a given reference scale. This allows an individual evaluation with a fine gradation of individual image quality characteristics, in which even subtle nuances can be taken into account in assessing the acceptability of an image. Furthermore, the concept of a fixed reference scale allows comparisons between different possible forms of output.

In the determination of grade values, the preferred criteria are sharpness and/or contrast and/or exposure light level and/or resolution and/or grain size and/or percentage of a cut-off image portion. The grade values are then compared to the target values assigned to each of the different characteristics. It has been found, that in particular a combined evaluation of the foregoing image characteristics offers the possibility of a high-quality grading process in assessing whether an individual image and image data set will provide an acceptable output result.

In an embodiment of the invention where the available output options are individual paper prints and index sheets, the target values assigned for the evaluation of an index print are selected so that the index print will in all cases be passed as acceptable for output. In order to inform the customer about the entire content of the image data set, the index sheet shows all of the images, including those that were rejected per se as being unacceptable for output by the system. If the index sheet contains images that were graded as unacceptable, it is of advantage if additional information is photo-printed on the index sheet to indicate the reason why the image was judged to be unacceptable, for example because of an insufficient exposure light level.

To save the customer unnecessary expenses caused by the printing of unwanted images, the images or image data are released for certain forms of output only if the grade values determined for an image meet the target values assigned to the selected form of output.

In some cases it can be appropriate to grade certain image characteristics in combination, for example contrast and sharpness, or contrast and light level, so that images or image data are released for output only if a combination of grade values meets a combination of target values assigned to the selected form of output. This offers the possibility to pass an image as acceptable in cases where the grade value of one or more individual image characteristics does not meet the given criteria, but if other image characteristics that could compensate for the unsatisfactory values are meeting the acceptance criteria to an exceptionally high degree. For example, if a picture is found to be too low in contrast but exceptionally high in sharpness, it will still be passed as acceptable. In the same context, it is also conceivable to take interdependencies into account and to assign different weights to individual characteristics.

To take further into account that certain image characteristics are of specific importance for different forms of output, for example the coarse grain size which, as mentioned above, is acceptable in small print formats but becomes a problem with large-size paper copies, it is further proposed to treat different format sizes of paper prints as different forms of output.

A further subdivision and differentiation between different forms of output is achieved in the inventive method by treating different output devices as different forms of output.

To accommodate individual customer requests, it is proposed to assign different target values for the same form of output in different customer orders. This also offers the possibility of adjusting the minimum acceptable image quality level, e.g., to different price structures (premium quality pictures/budget-priced pictures).

As a further possible form of processing output, the digitized image data of a given customer order can be written onto a data carrier in a data-writing device. There are again target values assigned to this form of output to ensure that all of the image data in each case meet the output quality criteria. This process makes a storage medium with all of the image data available, so that reorders can be placed at a later time. There is also the possibility that those image data sets that did not meet the output quality criteria are processed manually outside the photo laboratory, whereby the quality can in some cases be significantly improved.

According to a further preferred embodiment of the invention, it is proposed to store the image data and their associated grade values in a memory device, preferably before transmitting the data to an output device. This has several advantages. For example the image data required to generate an output can be sent from the memory device to different output devices in parallel or sequentially, in order to simplify or expedite the processing of the order. It is further possible to keep the image data and their associated grade values stored in the memory device for a predetermined length of time, so that the customer can place reorders within the given time frame without the need to repeat the scanning of original images.

The are different possibilities to generate the input image data. For example, image data can be produced by scanning an image carrier such as a negative film. As an alternative or in addition, the image data can also be read from a data storage device and/or acquired through a data interface. The latter concept also includes the possibility of transmitting the image data through a communications network, for example over the Internet.

In one embodiment of the invention, the grade values are determined directly on the basis of the input image data. This is particularly recommended in cases where the input image data have already undergone manual processing.

It is also of particular advantage to subject the input image data to at least one image correction prior to determining the grade values. This is recommended in cases where the input image data were generated from films or came directly from a digital camera.

BRIEF DESCRIPTION OF THE DRAWINGS

Further features and advantages of the invention will become apparent from the following description of a preferred embodiment as well as several examples of applications which are referenced against the attached drawings, wherein:

FIG. 2 represents an image data set with the respective image characteristics and grade values associated with each image; and FIGS. 3 to 6 represent different possible forms of output with their respective target values for the relevant image characteristics.

DETAILED DESCRIPTION OF A PREFERRED EMBODIMENT

Figure 1:
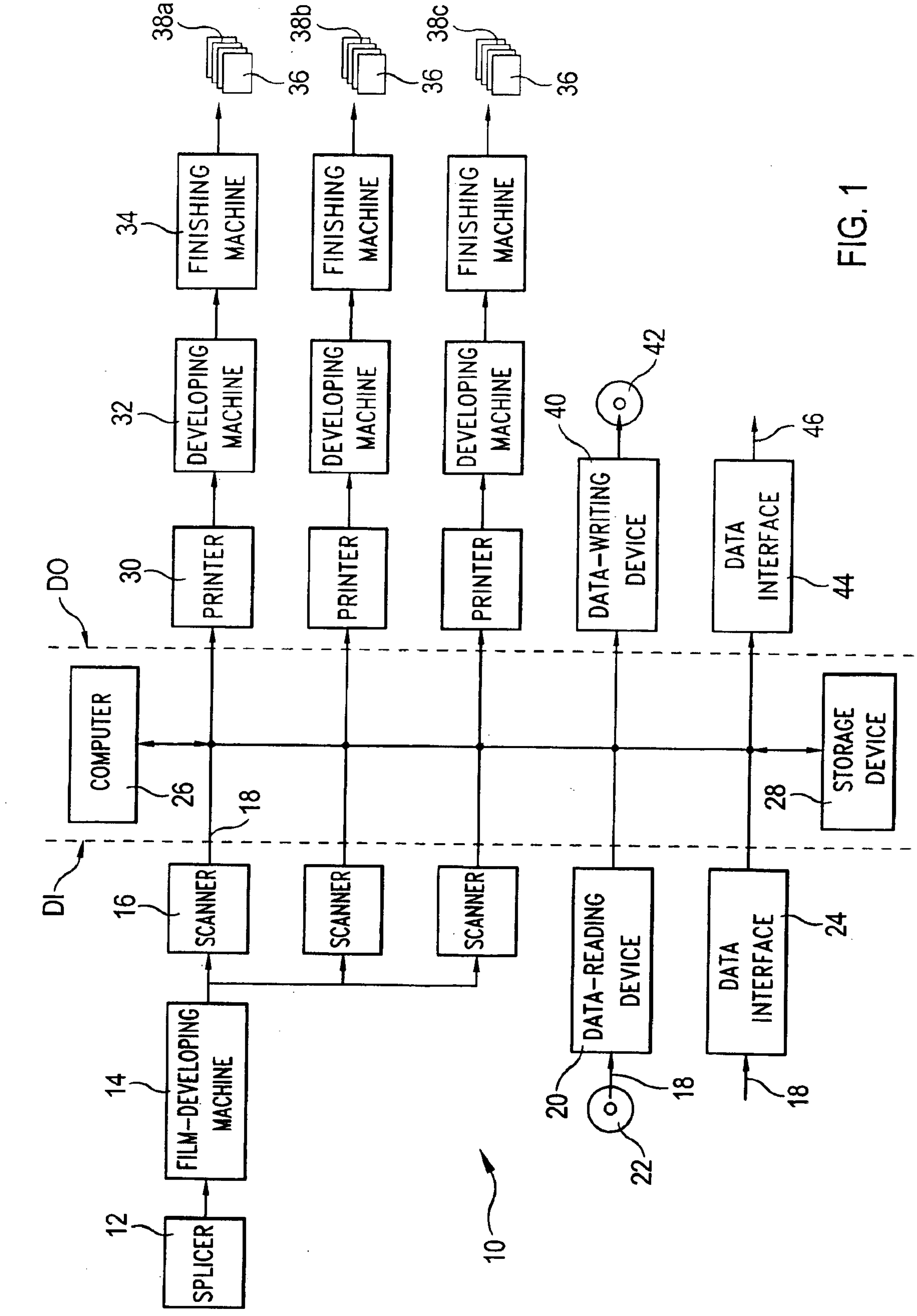
FIG. 1 gives a schematic representation of a laboratory system which has several output devices for producing different forms of output and operates according to the inventive method.

FIG. 1 gives a schematic view of a laboratory system which operates in accordance with the method of the present invention. The laboratory system 10 includes a splicer 12 that serves to cement a plurality of negative films together into a continuous ribbon in which each negative film represents a customer order. The negative films are subsequently developed in a film-developing machine 14 and after the developing process are fed into a scanner 16. The scanner 16 scans the image originals represented on the negative films and generates corresponding input image data 18 that are assembled into an input image data set for each order.

In parallel to the devices just described, the laboratory system 10 of FIG. 1 is also equipped with a data-reading device 20 that serves to read input image data 18 which are stored on data carriers 22 such as CD-ROMs, and further with a data interface 24 that is connected to a data network through which input image data 18 can be delivered to the laboratory system 10.

The individual input data sets, in particular those originating from cameras, are subjected to different corrective operations, e.g., an image sharpness correction, a contrast correction, and other, similar corrections. The input image data 18 that have been entered and in some cases corrected are subsequently transmitted through a data input device DI into the network of the laboratory system 10 which is connected to a central computer 26 and a long-term storage device 28. The central computer 26 performs the administration of the input image data sets, including for example the task of assigning the individual data sets to the desired forms of output.

Next, the image data are subjected to a grading algorithm, as will subsequently be explained in more detail, and stored in the long-term storage device and/or transmitted directly to output devices.

The network further includes a data output DO to which the different output devices are connected. For example, the data output device is connected to several printers 30, transmitting the different image data sets to them so that the requested images can be printed on paper. The photographic paper is subsequently treated in a paper-developing machine 32 and then passed on to a finishing machine 34 for cutting and packaging. The illustrated laboratory system 10 makes use of a plurality of different output possibilities. For example, each of the printers 30 produces index print sheets 36 as well as image copies 38*a*, 38*b* and 38*c* that are distinguished from each other by different paper formats or different kinds of paper.

Further connected to the data output DO and representing additional possible forms of output are a data-writing device 40 to transfer data to data carriers 42, as well as a data interface 44 to transmit image data to the outside.

The output devices evaluate the input image data 18 of the different orders in regard to their fitness for delivery at the output.

FIG. 2 shows an image data set 50 containing a total number of n images 52. The set includes for each picture 52 the actual image data 54 as well as a plurality of evaluated image characteristics 56. Counted as image characteristics 56 are the exposure light level, contrast, degree of sharpness, resolution, grain size, percentage of the image original that has been cut off as well as the characteristic of being a so-called fill-in frame. The term "fill-in frame" means an empty exposure that was made after inserting a new roll of film without uncovering the lens. The purpose of advancing the unexposed film at the beginning is to ensure that the start of the roll that was exposed during the threading-in process has actually been transported out of the exposure window before taking the first picture. In other words, fill-in frames are in most cases unexposed gaps at the beginning of a roll of film.

Specific to each picture, a grade value 58 is given to each of the different image characteristics 56. A value of 100 indicates the maximum degree of meeting the criterion for the respective characteristic, while lesser values indicate a reduced degree of fulfilling a criterion. Only in case of the fill-in frame characteristic is a binary yes/no value used as a grade value 58.

Image No. 1, for example, represents an unexposed gap at the beginning of the film, so that the fill-in frame characteristic takes on the value "yes". In this case, all other characteristics are automatically assigned a value of zero. Image No. n, on the other hand, represents a correctly exposed image which is only slightly overexposed, so that the exposure characteristic is given a value of 85. The image characteristics of resolution and grain size are likewise only conditionally in conformance and are each rated at a grade value of 80. The remaining image characteristics were rated at a grade value of 100.

After the image data sets 50 have been prepared in this manner, they are transmitted to the different output devices 30, 40 and 44 in accordance with the instructions of the customer order. Different target values are prescribed for each of the different forms of output. Each target value represents a tolerance limit for the corresponding grade value and determines whether or not a print copy is to be produced or, if applicable, whether or not the image data are to be issued at the output or not.

FIG. 3 shows the output data set 60 for the output format index print sheet 36. All of the target values 62 are set at "0", and the fill-in frame characteristic is set at "no" so that the image date of all pictures 52 of the image data set 50 can be passed on to the output. In addition, it is possible to project image-specific information onto the index print sheet 36 to inform the customer of the reason why a picture was rated unacceptable for output. This information can be based on the image data 54.

FIG. 4 illustrates an output data set 60 for the output format 38*a*, 3½" paper print, in which each of the image characteristics "underexposed", "overexposed", "contrast", "sharpness", "resolution", "grain size" has been assigned a target value of 80. This means that images 52 for which the grade values 58 meet or exceed the target value of 80 are printed out. If on the other hand at least one of the grade values 58 falls short of the target value 62, no paper print will be produced.

If for example a larger paper format were desired, the target value for the resolution of pictures from digital cameras or for the grain size of scanned films would be set higher.

FIG. 5 defines an output data set 60 for the output format "CD-ROM". In this data set 60, all target values are set to zero, and the target value for the image characteristic "Fill-in Frame" is set to "yes", so that all of the image data 52 of the complete film are stored on the CD-ROM.

The last example, FIG. 6, illustrates an output data set 60 for the output format "Data Interface", in which all of the target values 62 are set to zero and wherein only the image data 52 of the unexposed gaps at the beginning of the film roll will be omitted from the transmission, because the "Fill-in Frame" characteristic is set to "no".

The different forms of output described above represent only a small selection of all possible combinations of target values 62 for the image characteristics 56. For example, the invention also includes the concept that combinations of different target values for the image characteristics have to be met in order to pass a picture as acceptable for output. Under this concept, different image characteristics are evaluated in combination with each other, so that in a case where one of the characteristics, for example contrast, does not meet the target value, another characteristic such as sharpness can compensate for the deficient contrast, if that other characteristic has an exceptionally high grade value.

What is claimed is:

1. A method of automatically evaluating an image being processed in a photographic laboratory system which is operable to produce a plurality of different selectable forms of output, wherein said image is present in one of the forms of a physical image and of an image data set, and wherein the evaluation of said image serves to determine whether or not the image is of sufficient quality to merit processing into one of said forms of output, the method comprising the steps:

determining grade values for each of one or more characteristic image properties, assigning target values to be met by the grade values relative to each of the one or more characteristic image properties and specific to each of said different forms of output, selecting one of said different forms of output, and comparing the grade values to the target values for the selected form of output.

2. The method of claim 1, wherein each of the grade values comprises a grading factor that is determined in accordance with a given reference scale for each of the one or more characteristic image properties.

3. The method of claim 1, wherein the one or more characteristic image properties comprise at least one of sharpness, contrast, exposure light level, resolution, grain size, and percentage of a cut-off image portion.

4. The method of claim 1, wherein said different forms of output comprise a first form of output of individual paper prints and a second form of output of index prints, and wherein the target value assigned for said second form of output for each of the one or more characteristic image properties is set so that in every case the image will be found of sufficient quality to merit processing into said second form of output.

5. The method of claim 1, wherein the image is processed into the selected form of output only if the grade values meet the target values for all of the one or more characteristic image properties relative to the selected form of output.

6. The method of claim 1, wherein the one or more characteristic image properties comprise a plurality of characteristic image properties, and wherein the image is processed into the selected form of output only if a combined grade value for two or more of the characteristic image properties for the selected form of output meets a corresponding combined target value.

7. The method of claim 1, wherein said different forms of output comprise a plurality of different output formats for paper prints.

8. The method of claim 1, wherein said different forms of output comprise outputs produced by a plurality of different output devices.

9. The method of claim 1, wherein for a given characteristic image property and a given form of output, a different target value is set in different customer orders.

10. The method of claim 8, wherein said different forms of output include a digital output by writing the image data set into a data-carrier device, and wherein the target value assigned for said digital output for each of the one or more characteristic image properties is set so that in every case the image will be found of sufficient quality to merit processing into said digital output.

11. The method of claim 1, further comprising the step of storing the image data set and the grade values for each of the one or more characteristic image properties in a data-storage device prior to transmitting said image data set to an output device.

12. The method of claim 1, further comprising at least one of the steps of generating said image data set by scanning said physical image, reading said image data set from a data-storage device, and receiving said image data set through a data interface, wherein the image data set represents an input data set for said photographic processing system.

13. The method of claim 12, wherein the grade values for the one or more characteristic image properties are determined from said input data set.

14. The method of claim 13, further comprising the step of performing at least one image correction on the input data set prior to determining the grade values for the one or more characteristic image properties.

* * * * *